(12) United States Patent
Challoner

(10) Patent No.: US 10,365,102 B1
(45) Date of Patent: Jul. 30, 2019

(54) INERTIAL WAVE ANGLE GYROSCOPE

(71) Applicant: Inertialwave, Manhattan Beach, CA (US)

(72) Inventor: Anthony Dorian Challoner, Manhattan Beach, CA (US)

(73) Assignee: Inertialwave, Manhattan Beach, CA (US)

( * ) Notice: Subject to any disclaimer, the term of this patent is extended or adjusted under 35 U.S.C. 154(b) by 469 days.

(21) Appl. No.: 15/170,918

(22) Filed: Jun. 1, 2016

Related U.S. Application Data

(60) Provisional application No. 62/176,902, filed on Jun. 1, 2015, provisional application No. 62/233,438, filed on Sep. 27, 2015.

(51) Int. Cl.
*G01C 19/5677* (2012.01)

(52) U.S. Cl.
CPC .................................. *G01C 19/5677* (2013.01)

(58) Field of Classification Search
CPC .................................................. G01C 19/5677
See application file for complete search history.

(56) References Cited

U.S. PATENT DOCUMENTS

| | | | |
|---|---|---|---|
| 4,951,508 | A | 8/1990 | Loper |
| 7,437,253 | B2 | 4/2008 | Shcheglov |
| 2005/0172714 | A1* | 8/2005 | Challoner ......... G01C 19/5684 73/504.12 |

OTHER PUBLICATIONS

Taheri-Tehrani, et al. "A new electronic feedback compensation method for rate integrating gyroscopes," 2016 IEEE International Symposium on Inertial Sensors and Systems, Laguna Beach, CA, 2016, pp. 9-12. (Year: 2016).*

Challoner et al., "Boeing disc resonator gyroscope" in 2014 IEEE/ION Position Location and Navigation Symposium, PLAN2014, May 5, 2014-May 8, 2014, Monterey CA, pp. 504-514.

Trusov et al., "mHRG: Miniature CVG with Beyond Navigation Grade Performance and Real Time Self-Calibration", in IEEE Inertial Sensors 2016, Laguna Beach, Feb. 23, 2016.

(Continued)

*Primary Examiner* — John E Breene
*Assistant Examiner* — Jeffrey C Morgan
(74) *Attorney, Agent, or Firm* — Canady & Lortz LLP; Bradley K. Lortz

(57) ABSTRACT

A compact Inertial Wave Angle Gyroscope (IWAG) is disclosed without zero rate drift due to residual asymmetry comprises antisymmetric velocity feedback of sufficient magnitude to produce a continual self-precession of its vibration pattern to overcome any rate threshold and average the effects of its residual asymmetry on zero rate drift to zero over each revolution of the precession pattern in the case. The inertial rotation input is determined from the measured total precession rate by removing the computed self-precession rate. A compact, low power, IWAG electronics design suitable for an ASIC collocated with the MEMS resonator comprises analog electronic feedback for self-precession, amplitude and quadrature control and asymmetry correction and analog inertial rate output that is digitally-assisted by intermediate frequency processing for control offset correction, residual asymmetry parameter identification for analog feedback gain correction and electrostatic tuning bias correction and compensated digital inertial rate output.

20 Claims, 11 Drawing Sheets

(56) References Cited

OTHER PUBLICATIONS

Lynch, "MRIG Frequency Mismatch and Quadrature Control", IEEE ISSIS 2014, Feb. 25, 2014.
Taheri-Tahrani et al., "Disk Resonator Gyroscope with Whole-Angle Operation", IEEE ISSIS 2015, Mar. 23-25, 2015.
IEEE STD 1431-2004, IEEE Standard Specification Format Guide and Test Procedure for Coriolis Vibratory Gyros.
Taheri-Tahrani et al., "A New Electronic Feedback Compensation Method for Rate Integrating Gyroscopes", IEEE ISSIS 2016, Feb. 23-25, 2016.

* cited by examiner

```
fr=126000; Qr=1e7;%e7actual resonator frequency and Q
pn=21e-15;xo=3e-6;an=pn/xo; %Phase I angle noise model
f=200; w=2*pi*f;%simulation frequency
Sr=fr/f; %actual/simulated frequency ratio
%Asymmetry
Dm=8e-7;%mechanical trim resolution (Phase I)
De=1;%post electrostatic stiffness trim resolution
Dpk=0.0001;%electronic stiffness polishing resolution
Dpq=1;% electronic damping polishing resolution
delk=Dpk*De*Sr*Dm;  thw= 30/r2d;
deld=Dpq*Dm;   thd= 60/r2d;
Dk=delk/2*[-cos(2*thw),sin(2*thw);sin(2*thw),cos(2*thw)];
Dd=deld/2*[-cos(2*thd),sin(2*thd);sin(2*thd),cos(2*thd)];
tau=Qr/pi/fr;
n=2;
k=0.3*n;% modal angular gain
Wo=1; % self-precession rate is PHI=-2*k*W relative to body coordinates
q=0;a=1;theta=0;
ks=w^2;ds=2/tau;Ditau=deld/tau;
% x0=[-q*w*sin(theta) q*w*cos(theta) a*cos(theta) a*sin(theta)]/sqrt(1);n=2;
x0=[0 0 1 0]/sqrt(1);
```

Model Results (see next plots):
thwed = 31.432 (est)
thwd = 30.000  (act)
thded = 63.067
thdd = 60.000
delke = 5.0607e-008
delk = 5.0400e-008
Ditaue = 3.1712e-008
Ditau = 3.1667e-008
delde = 8.0114e-007
deld = 8.0000e-007
Omegaw = 0.0081648 dph
Omegad = 0.0054432 dph

FIG. 7A

INERTIAL WAVE ANGLE GYROSCOPE

CROSS-REFERENCE TO RELATED APPLICATIONS

This application claims the benefit under 35 U.S.C. § 119(e) of the following U.S. provisional patent applications, which are incorporated by reference herein:

U.S. Provisional Patent Application No. 62/176,902, filed Jun. 1, 2015, and entitled "Inertial Wave Angle Gyroscope," by Challoner; and U.S. Provisional Patent Application No. 62/233,438, filed Sep. 27, 2015, and entitled "Inertial Wave Angle Gyroscope," by Challoner.

BACKGROUND OF THE INVENTION

1. Field of the Invention

The present disclosure relates to the measurement of the inertial orientation or angle of an object using a compact vibratory gyroscope.

2. Description of the Related Art

There is a need for compact, low power gyroscopes without zero rate drift for improved navigation and pointing. A Coriolis Vibratory Gyroscopes (CVG) operated in rate mode contributes errors to navigation and pointing due to integration of rate noise and due to a practical bandwidth limitation in self-calibrating zero rate drift with only a single rate gyroscope. A CVG, operated in rate integrating gyro (RIG) or whole angle (WA) mode, e.g. Hemispherical Resonator Gyroscope (HRG) or Disc Resonator Gyroscope (DRG) measures precession angle, $\theta$ or rate $\dot{\theta}$, and not force to derive inertial rate as $\Omega=-k\dot{\theta}$, where k is the resonator angular gain factor. See FIG. 1A.

However, such a RIG has a rate threshold due to resonator mechanical stiffness asymmetry and zero rate drift due to errors in electronic correction or compensation of resonator damping asymmetry and uses complex, high power digital baseband control electronics including a phase lock loop to track resonator phase and to control amplitude and quadrature and correct or compensate for asymmetry based on precession angle. Microelectromechanical (MEMS) CVGs vs conventionally machined CVGs are compact but suffer greater asymmetry after micromaching and naturally higher rate thresholds, so that MEMS whole angle operation has only been used or demonstrated when there are high input rates. A method to overcome the larger asymmetry of MEMS CVGs and eliminate zero rate drift by operation as an Inertial Wave Rate Gyroscope measures the force to precess the vibration pattern at a high rate, exceeding the input rate alone. This Inertial Wave Gyroscope method with continually precessing vibration pattern overcomes any residual rate threshold and averages the effects of asymmetry on long term zero rate drift to zero, however it suffers the above noted limitations of rate gyroscopes due to rate noise from measurement of precession force and the complexity of another active control loop to regulate precession.

What is needed therefore is a method of operating a single Inertial Wave Angle Gyroscope (IWAG) that measures precession angle or rate not precession force or Coriolis force without a rate threshold or zero rate drift due to residual asymmetry. Furthermore a simple IWAG electronics design is needed without the prior art high power, low-latency digital control loops to track resonator phase or regulate amplitude, quadrature or precession and suitable for compact ASIC electronics implementation and colocation with an approximately symmetric MEMS resonator and having low noise, high bandwidth, and high accuracy. Finally, continual self-identification and correction of asymmetries is needed to correct the inherently larger MEMS initial asymmetries and maintain finely tuned correction or compensation errors to a very low level residual, within precession angle or rate measurement resolution. These and other needs are met by the present invention as disclosed hereafter.

SUMMARY OF THE INVENTION

A compact Inertial Wave Angle Gyroscope (IWAG) is disclosed without zero rate drift due to residual asymmetry comprises antisymmetric velocity feedback of sufficient magnitude to produce a continual self-precession of its vibration pattern to overcome any rate threshold and average the effects of its residual asymmetry on zero rate drift to zero over each revolution of the precession pattern in the case. The inertial rotation input is determined from the measured total precession rate by removing the computed self-precession rate. A compact, low power, IWAG electronics design suitable for an ASIC collocated with the MEMS resonator comprises analog electronic feedback for self-precession, amplitude and quadrature control and asymmetry correction and analog inertial rate output that is digitally-assisted by intermediate frequency processing for control offset correction, residual asymmetry parameter identification for analog feedback gain correction and electrostatic tuning bias correction and compensated digital inertial rate output.

In one example embodiment of the invention, a compact Inertial Wave Angle Gyroscope measuring precession angle or rate having no zero rate threshold or zero rate drift due to residual asymmetry comprises antisymmetric velocity feedback of sufficient magnitude to produce a continual self-precession of its vibration pattern. The inertial rotation rate input is determined from the measured total precession rate after subtracting the modeled or calibrated self-precession rate. The continual precession overcomes any rate threshold and eliminates rate drift at zero rate input by averaging the effects of its residual asymmetry to zero over each revolution of the precession pattern in the case.

In further example embodiments, a compact, low-power IWAG ASIC electronics design is used comprising Analog Front End (AFE), Analog Control Electronics (ACE) and an Intermediate Frequency Precession Processor (IFP). The IWAG ASIC may be collocated with a MEMS resonator for low noise interconnect with the AFE and so that resonator frequency can be used for temperature compensation or regulation of both. The ACE provides feedback for self-precession, amplitude and quadrature control, asymmetry correction and wideband inertial rate output. The IFP provides precision digital inertial rate output and refined asymmetry identification and correction or compensation. Parameters of the precession motion including amplitude, quadrature, precession rate and inertial rate output are determined using analog resonator velocity or position measurements at resonator frequency in the ACE, and at an intermediate frequency in the IFP, without requiring resonator phase tracking. The electronic feedback forces for amplitude and quadrature control and asymmetry correction are generated from analog resonator velocity and position measurements and analog parameters of motion determined directly at resonator frequency in the ACE. Voltage biases in the AFE for electrostatic stiffness correction and analog control parameter adjustments in the ACE are determined by the IFP. Initial asymmetry is corrected by means of initial analog electronic velocity or position feedback or initial electrostatic voltage biases. The Fourier components of precession angle or precession rate variation vs. precession angle with zero or constant input rate are determined by IFP and used to refine asymmetry correction or compensation parameters or analog amplitude and quadrature control parameters. Resonator frequency is determined in the IFP relative to a stable clock for identification and correction of frequency asymmetry and temperature compensation or control of colocated resonator and IWAG electronics.

A typical embodiment of the invention comprises a gyroscope including a resonator having residual asymmetry small enough to yield a defined self-precession rate of a vibration pattern of the resonator and readout electronics coupled to the resonator for generating the defined self-precession rate of the vibration pattern of the resonator. The readout electronics measure a total precession rate of the resonator, and subtract the defined self-precession rate from the measured total precession rate to yield an inertial rate output. The defined self-precession rate can be defined by a measurement of actual precession rate of the resonator with zero inertial rate input. Alternately, the defined self-precession rate can be defined by a model of the readout electronics and resonator.

In some embodiments, the readout electronics can be implemented in an application specific integrated circuit (ASIC). The readout electronics can generate the sufficient precession force employing analog electronic feedback including amplitude and quadrature control. The readout electronics can correct common mode damping and stiffness over temperature and time employing substantially fixed electronic feedback correction of damping asymmetry parameters and stiffness asymmetry parameters. In addition, the readout electronics can include an intermediate frequency processor for control offset correction, residual asymmetry parameter identification for analog feedback gain correction and electrostatic tuning bias correction and compensated digital inertial rate output.

In further embodiments, the readout electronics can reverse a direction of the defined self-precession rate. Reversal of the direction of the defined self-precession rate can be performed periodically or based on the resonator reaching a threshold precession angle.

Similarly, a typical method embodiment for operating a gyroscope comprises the steps of providing a resonator having residual asymmetry small enough to precess a vibration pattern of the resonator with a defined self-precession rate, generating the defined precession rate of the vibration pattern of the resonator with readout electronics coupled to the resonator, measuring a total precession rate of the resonator, and subtracting the defined self-precession rate from the measured total precession rate to yield an inertial rate output. The method embodiment can be modified consistent with any apparatus embodiments described herein.

BRIEF DESCRIPTION OF THE DRAWINGS

Referring now to the drawings in which like reference numbers represent corresponding parts throughout:

FIGS. 7A, 7B, and 7C show example simulated IWAG parameters and response with damping and stiffness asymmetry and the estimated asymmetry parameters from precession rate variations.

DETAILED DESCRIPTION

1. Overview

As described above, it is an objective of the present disclosure to provide a single, compact, high bandwidth inertial wave angle gyroscope (IWAG) producing an inertial rate output without zero rate drift. It is a further objective to operate with direct analog electronic feedback or electrostatic voltage trim suitable for implementation with a compact MEMS resonator having approximate symmetry and a low power Application Specific Integrated Circuit (ASIC) having direct analog control electronics at resonator frequency with intermediate frequency digital processing of precession motion parameters that may be collocated and operated along with the MEMS resonator for low noise and at the same temperature.

In one example embodiment of the invention, an Inertial Wave Angle Gyroscope (IWAG) is described hereafter comprising a resonator with sufficiently small residual asymmetry after correction with electronic feedback and electrostatic forces to yield a defined self-precession rate of the vibration pattern of the resonator and readout electronics to generate a defined self-precession rate of the vibration pattern to measure inertial angle from total precession rate less the defined self-precession rate.

2. Self-Precession

Figure 1A:
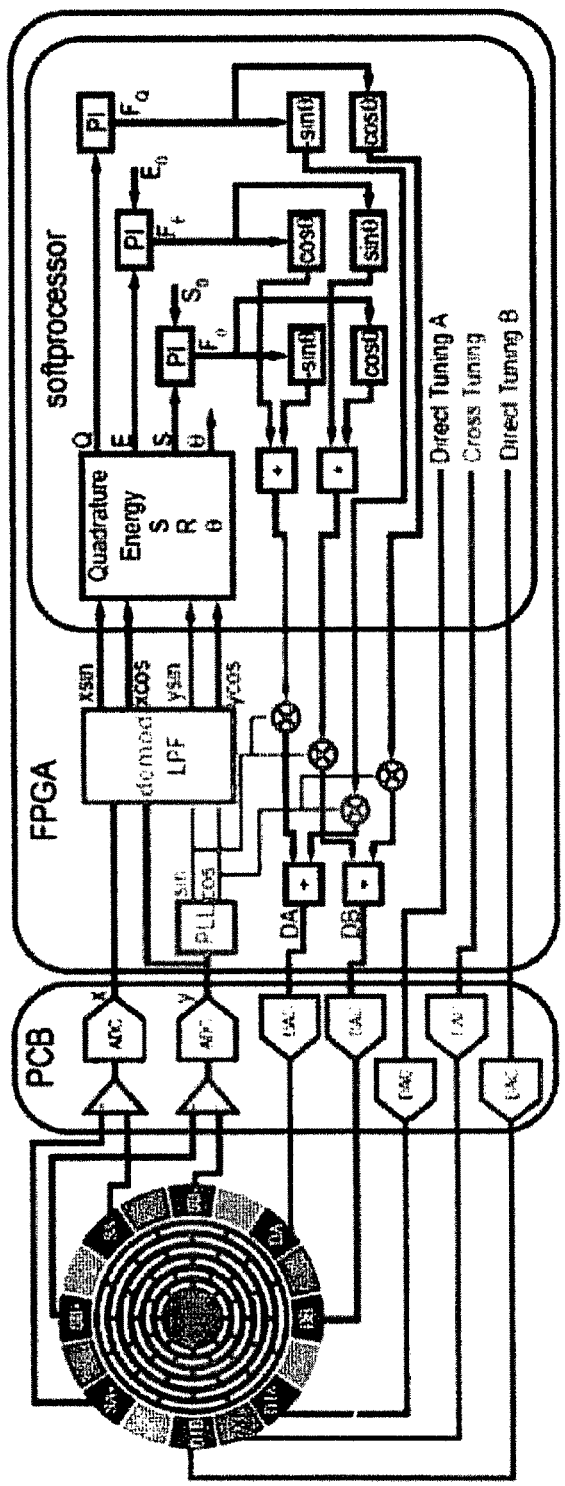
FIG. 1A is a block diagram of a prior art CVG, operated in rate integrating gyro (RIG) or whole angle (WA) mode.
Figure 1B:
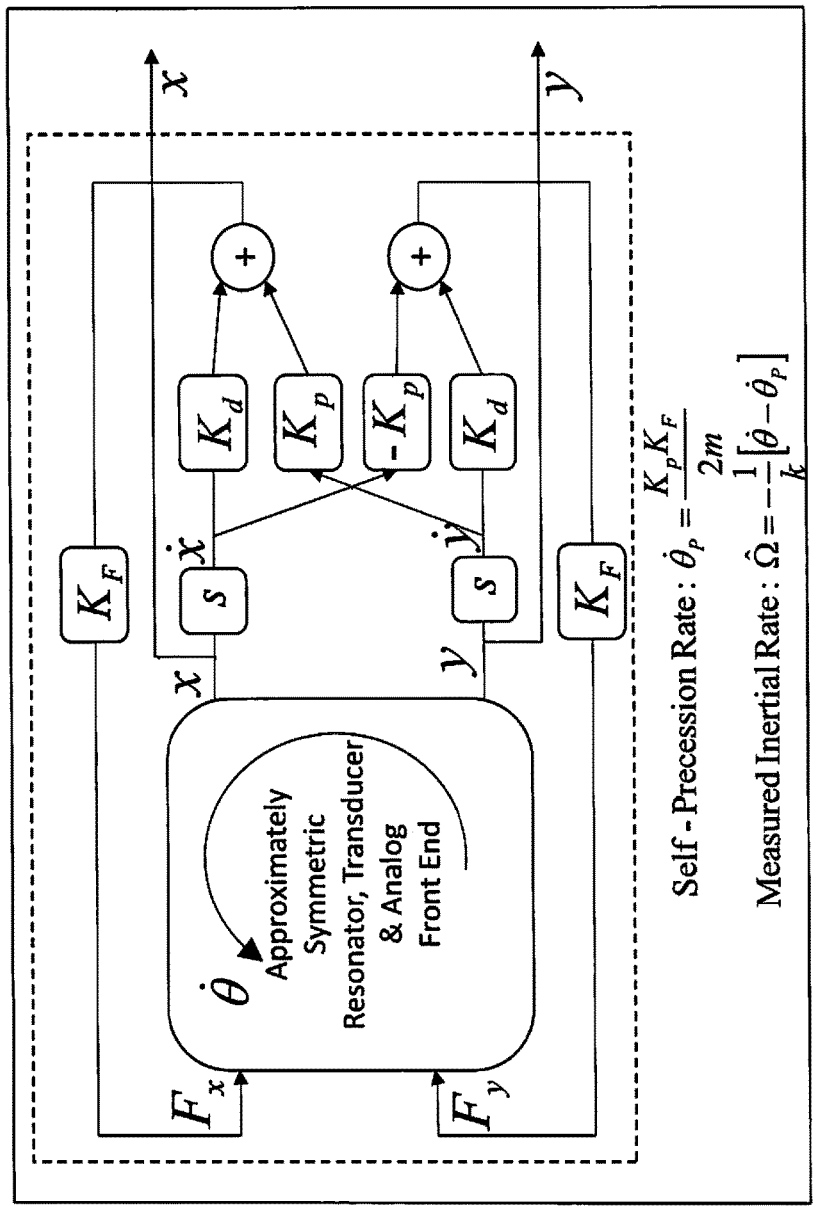
FIG. 1B illustrates velocity feedback control to sustain vibration and induce self-precession of an approximately symmetric resonator with transducers and front end electronics and the computation of inertial rate.

One example embodiment of the invention implementing self-precession is illustrated in FIG. 1B that shows an Inertial Wave Angle Gyroscope (IWAG) comprising a resonator having small residual asymmetry after mechanical trimming and application of electronically-determined correction forces, with transducers for sensing resonator motion and applying resonator forces, front-end electronics for sensing resonator vibration pattern position, x and y or velocity $\dot{x}$ and $\dot{y}$, and feedback control electronics to define resonator forces, Fx and Fy along two orthogonal resonator axes. The control electronics defines the velocity feedback forces to sustain the resonator vibration in the presence of passive damping and to define a self-precession rate of the vibration pattern without inertial rate input. Velocity feedback gain, $K_d$ is selected to cancel the passive damping using a practical automatic gain control method to be described in the sequel and sustain resonator vibration. Antisymmetric velocity feedback forces with gains $K_p$ and $-K_p$ are applied via force transducer gain $K_F$ to generate a defined self-precession rate $$\dot{\theta}_P = \frac{K_p K_F}{2m}$$

of the resonator vibration pattern with zero inertial rate input and sufficiently small residual asymmetry.

A measurement, $\hat{\Omega}$ of the inertial rate input, $\Omega$ is then determined from the measured vibration pattern precession rate, $\dot{\theta}$, the defined self-precession rate, $\dot{\theta}_P$ and the resonator angular gain, k, as $$\hat{\Omega} = -\frac{1}{k}[\dot{\theta} - \dot{\theta}_P].$$

The defined self-precession rate $\dot{\theta}_P$ can be defined by a model of the resonator and readout electronics as above or from a measurement of total precession rate $\dot{\theta}$ with zero inertial rate input, i.e. $\Omega = 0 \Rightarrow \dot{\theta}_P = \dot{\theta}$.

With the prior art RIG operation (as shown in FIG. 1A), even small residual asymmetry results in significant zero rate drift; with IWAG self-precession these rate errors average to zero over each vibration pattern revolution thus eliminating long term zero rate drift.

For example, a resonator vibrating with in-phase amplitude a and quadrature amplitude q, mechanical damping asymmetry $$\Delta\left(\frac{1}{\tau}\right),$$

uncorrected with electronic forces, with principal axis angle $\theta_\tau$, frequency asymmetry $\Delta\omega$ with principal stiffness axis at $\theta_\omega$, and with input rate $\Omega$ has a well-known pattern precession rate, without IWAG self-precession:

$$\dot{\theta} = -k\Omega - \frac{1}{2}\frac{a^2+q^2}{a^2-q^2}\Delta\left(\frac{1}{\tau}\right)\sin 2(\theta-\theta_\tau) + \frac{aq}{a^2-q^2}\Delta\omega\cos 2(\theta-\theta_\omega) \quad (1)$$

With zero inertial input rate, $\Omega = 0$ we then have a model of the zero-rate bias for a conventional RIG:

$$\Omega_d = -\frac{\dot{\theta}}{k} = \frac{1}{2k}\frac{a^2+q^2}{a^2-q^2}\Delta\left(\frac{1}{\tau}\right)\sin 2(\theta-\theta_\tau) - \frac{aq}{a^2-q^2}\frac{\Delta\omega}{k}\cos 2(\theta-\theta_\omega) \quad (2)$$

With conventional quadrature nulling this leaves a residual angle dependent zero rate damping drift $$\Omega_d = \frac{1}{2k}\Delta\left(\frac{1}{\tau}\right)\sin 2(\theta-\theta_\tau)$$

With MEMs large micro-machining errors it is desirable to correct this rate drift by matrix velocity feedback forces based on an estimate of the damping asymmetry parameters, e.g., $$\Delta\left(\frac{1}{\tau}\right)$$

and $\theta_\tau$.

With mean damping time constant, $\tau$, micro-machining error $\delta_\tau$, damping asymmetry $$\Delta\left(\frac{1}{\tau}\right) \sim \frac{\delta_\tau}{\tau}$$

and electronic correction error, $\delta_e$ the zero rate drift, $$\Omega_d \approx \frac{\delta_e \delta_\tau}{2k\tau}\sin 2(\theta-\theta_\tau),$$

depending on the precession angle, $\theta$. For conventional RIG operation at zero inertial rate input the maximum zero rate damping drift $$\Omega_d \leq \frac{\delta_e \delta_\tau}{2k\tau}.$$

For IWAG operation with a defined self-precession rate $$\dot{\theta}_P \gg \frac{\delta_e \delta_\tau}{2k\tau}$$

then $\theta \cong \dot{\theta}_P t$, to high accuracy based on simulation of typical MEMS cases so that $$\Omega_d \approx \frac{\delta_e \delta_\tau}{2k\tau}\sin 2(\dot{\theta}_P - \theta_\tau)$$

and so has the same maximum amplitude but is now time varying periodically at twice the self-precession rate so averages to zero every half precession period. Averaging over a long time period comprising approximately N precession periods to determine zero rate drift would yield an zero rate drift maximum $$\Omega_d \approx \frac{\delta_e \delta_\tau}{2k\tau}\frac{1}{2N}.$$

A significant reduction in zero rate drift over the prior art is thus possible using IWAG.

For example, a typical 0.6 mm DRG MEMS with f=250 kHz, Q=120K, k=0.8

$$\frac{1}{\tau} \approx \frac{\pi f}{Q} = 6.5 r/s,$$

k–0.8, $\delta_\tau$~0.01 and $\delta_e$=0.001 so that zero rate drift $$\Omega_d \le \frac{\delta_e \delta_\tau}{2k\tau} = 8.5 \text{ deg/h}$$

would be measured after long enough averaging to eliminate thermal noise. This noise is ~10 deg/h after 1 second and 1 deg/h after 100 second averaging. So after 100 seconds the conventional RIG maximum zero rate drift would remain 8.5 deg/h.

On the other hand for example, with an IWAG defined self-precession rate $\dot\theta_P$=0.5 Hz, then the zero rate drift would average to zero after each precession half-cycle with a maximum rate error $$\Omega_d \approx \frac{\delta_e \delta_\tau}{2k\tau} \frac{1}{2N} = 0.085 \text{ deg/h after ~100 sec } (N=50) \text{ averaging,}$$

a potential 100× reduction in zero rate drift, absent the thermal noise of 1 deg/h. This motivates further reductions in thermal noise from electronic and mechanical sources to take full advantage of IWAG.

3. IWAG Application Specific Integrated Circuit (ASIC)

Figure 2:
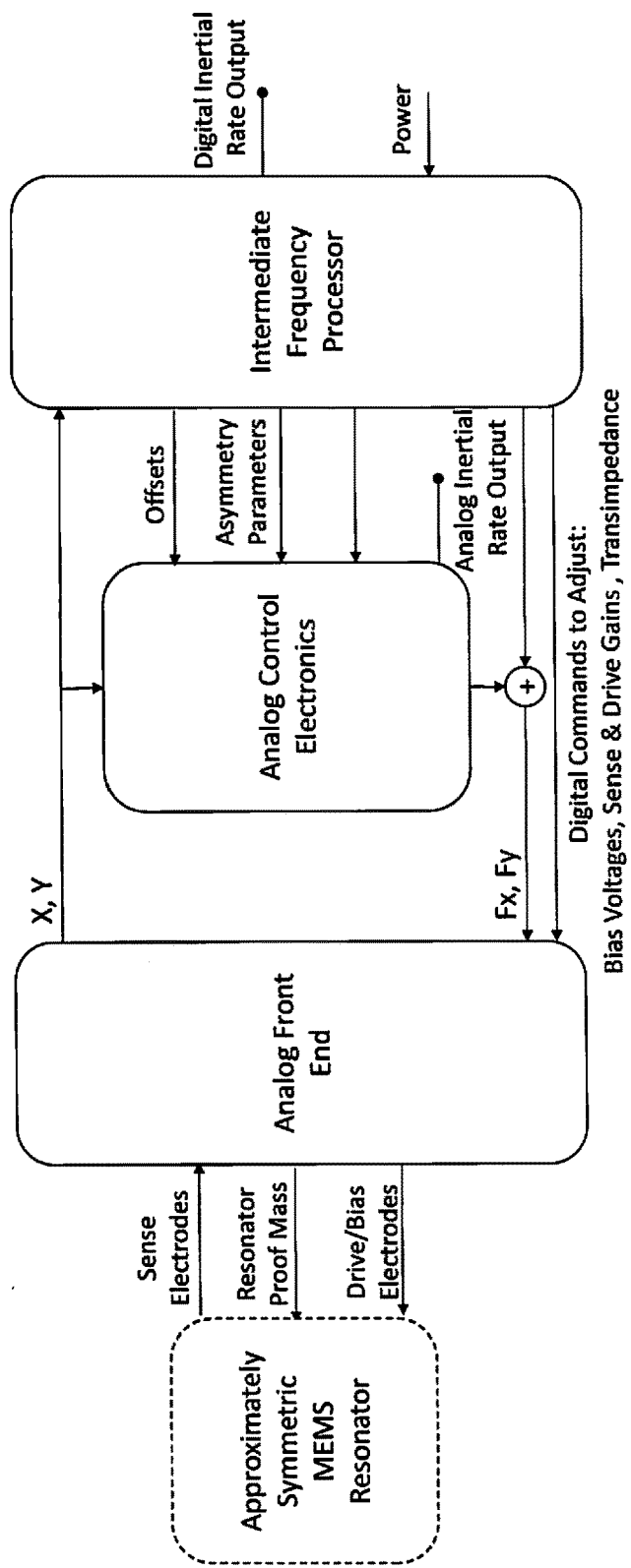
FIG. 2 is a block diagram of example IWAG ASIC electronics comprising Analog Front-End Electronics, Analog Control Electronics and Intermediate Frequency Processor to interface with the transducers of a MEMS resonator and produce analog and digital inertial rate outputs.

FIG. 2 is a block diagram of example IWAG ASIC electronics comprising Analog Front-End Electronics, Analog Control Electronics and Intermediate Frequency Processor to interface with the transducers of a MEMS resonator and produce analog and digital inertial rate outputs.

To implement IWAG self-precession with compact symmetric MEMS resonators the IWAG electronics in FIG. 2 is designed for implementation in a compact 180 nm CMOS ASIC process for low noise, low asymmetry correction or compensation error and low power. Both high bandwidth analog rate and high accuracy digital rate output are provided. This electronics design is suitable for collocation with the MEMS for low interconnection noise and common temperature. The latter enables use of resonator frequency to compensate electronics and mechanical sources of rate drift over temperature. A low-noise Analog Front End (AFE) interfaces with symmetric MEMS transducers for sense, drive and resonator biasing and outputs resonator analog position X and Y in response to analog control force inputs Fx and Fy. These forces are generated by the low power Analog Control Electronics (ACE) to provide self-precession, amplitude and quadrature control as well as damping and stiffness asymmetry feedback correction and wideband analog inertial rate output. This use of analog control and wideband analog rate together with precession parameter determination at intermediate frequency in the Intermediate Frequency Processor (IFP) removes the prior art requirement for low-latency digitization with digital feedback control and a phase lock loop to track resonator phase. This enables low power digitization with high resolution and linearity and subsequently high precision in parameter extraction and low numerical noise contribution.

4. Analog Front End

Figure 3:
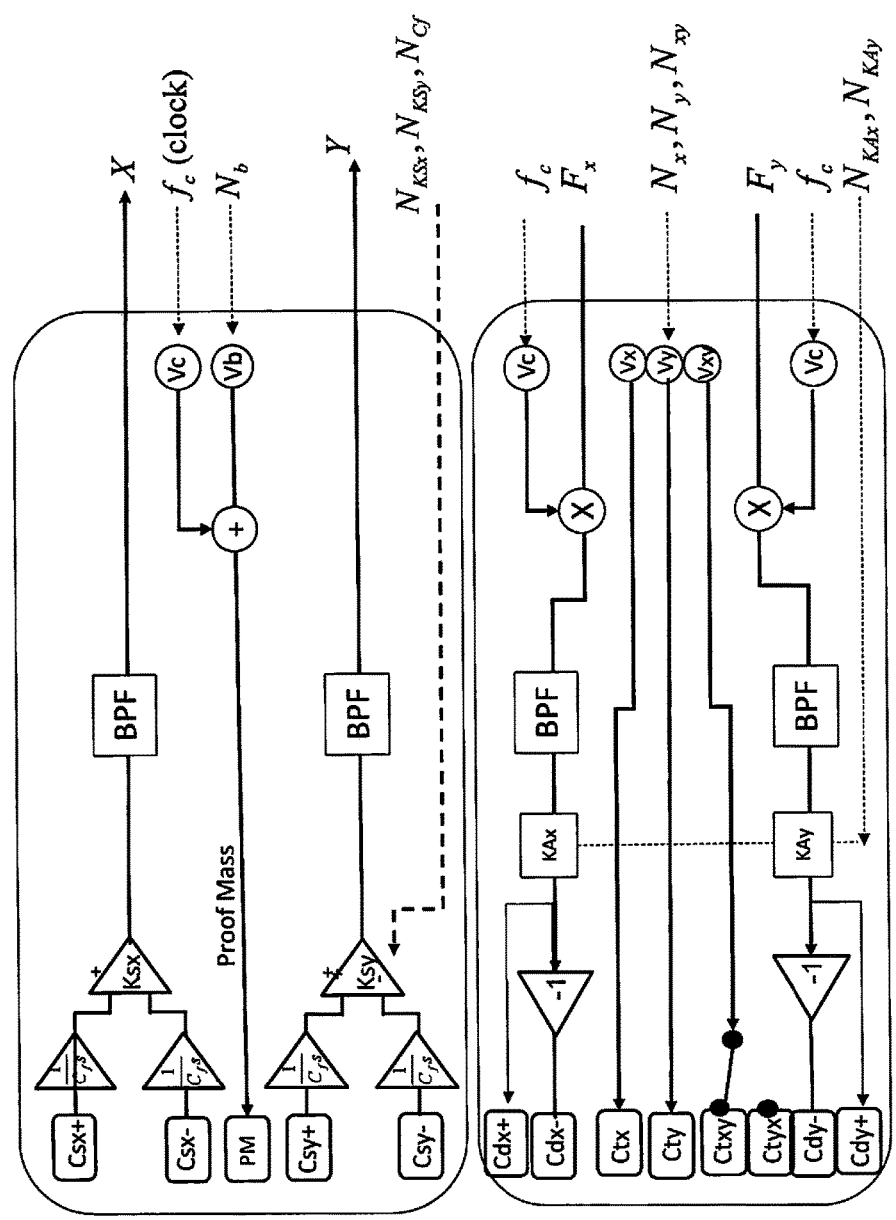
FIG. 3 is a block diagram of example Analog Front-End Electronics interfacing with a resonator with capacitive transducers and generating output voltages, X and Y proportional to resonator position on two axes.

FIG. 3 is a block diagram of example Analog Front-End Electronics interfacing with a resonator with capacitive transducers and generating output voltages, X and Y proportional to resonator position on two axes.

Five sense capacitance connections are provided for resonator proof mass bias or excitation and differential sense of MEMS resonator X and Y position. ASIC top metal or thermally matched glass interposer metal is preferably used to interconnect these five pads with the bonded silicon MEMS capacitance transducer array for lowest parasitic capacitance. Transcapacitance buffer differential pairs for each axis provide low noise pick off <10 zF/rt-Hz. Overall sense gain level and symmetry are set by initial laser trim or digital adjustments $N_{KSx}$, $N_{KSy}$ and $N_{Cf}$ from the IFP. Resonator proof mass bias voltage Vb is fixed or DAC adjusted $N_b$. An optional carrier Vc with frequency fc can be added to shift the resonator sense frequency from f to f+/–fc to eliminate parasitic drive noise by use of Electronic Amplitude Modulation (EAM).

Four drive capacitance connections in two differential pairs are provided to apply forces Fx and Fy to drive the resonator vibration on X and Y axes. Four tuning bias capacitance connections provide direct and cross axis electrostatic stiffness adjustments to reduce frequency asymmetry or quadrature. Initial laser trim or high resolution, e.g. 20 bits, commanded DAC levels ($N_x,N_y,N_{xy}$) from the IFP are used to adjust bias voltages Vx, Vy, Vxy. Overall drive attenuator level and symmetry are set by initial laser trim or digital adjustments $N_{KAx}$, $N_{KAy}$ from the IFP. Resonator proof mass bias voltage Vb is fixed or DAC adjusted $N_b$. An optional carrier Vc with frequency fc can be used to shift the ACE feedback forces Fx and Fy generated at intermediate frequency f+/–fc back to f for resonator control.

5. Analog Control Electronics

Figure 4:
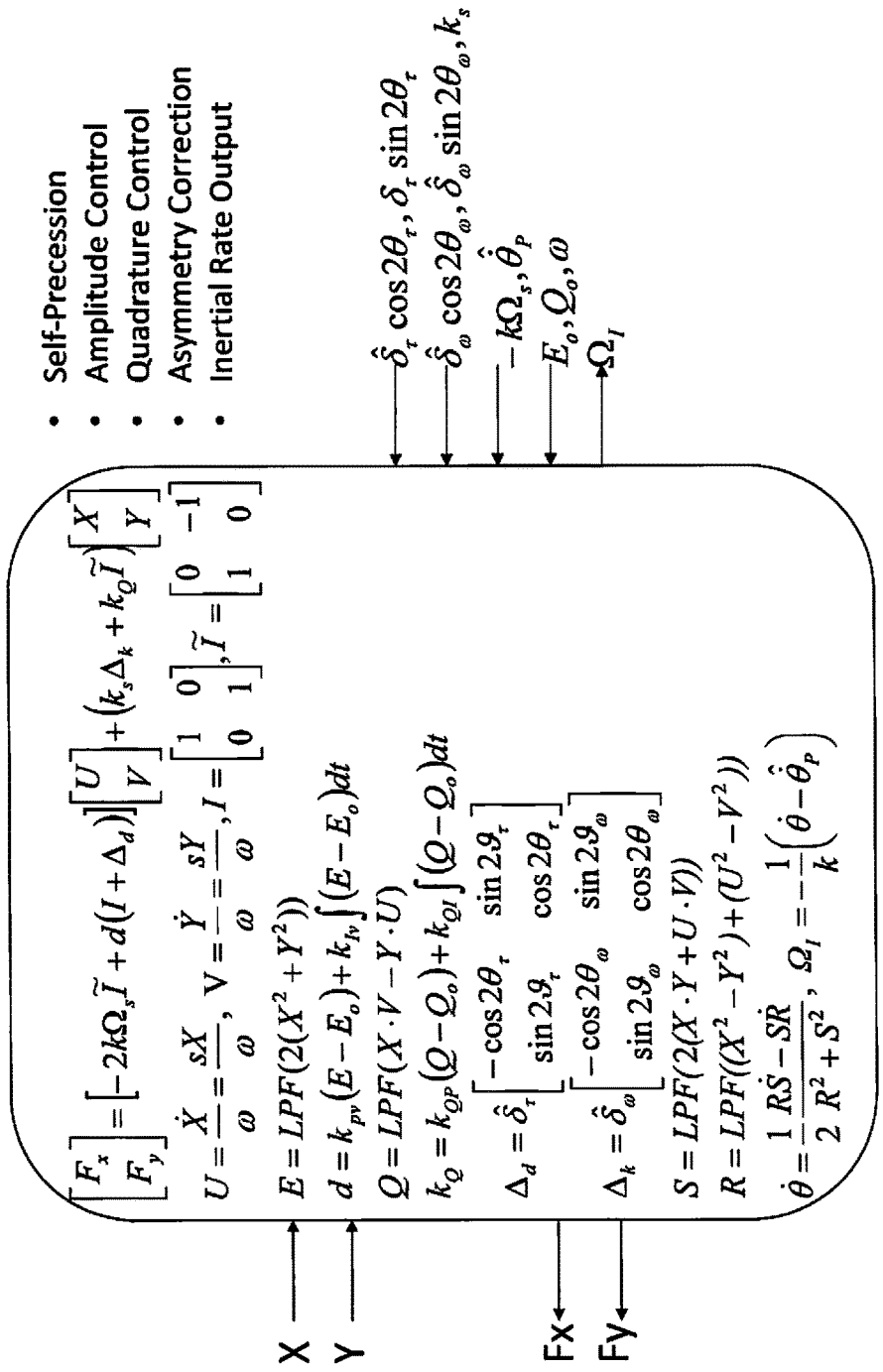
FIG. 4 is a detailed diagram of example Analog Control Electronics defining continuous time analog functions to process input voltages X and Y and generate the feedback control force signal outputs, Fx and Fy and an analog voltage signal $\Omega_I$, representing analog inertial rate.

FIG. 4 is a detailed diagram of example Analog Control Electronics defining continuous time analog functions to process input voltages X and Y and generate the feedback control force signal outputs, Fx and Fy and an analog voltage signal $\Omega_I$, representing analog inertial rate.

The continuous analog functions to induce a prescribed self-precession rate, $\dot\theta_P$=–$k\Omega_P$, control amplitude and quadrature and correct damping and stiffness asymmetry and to output analog inertial rate are defined in FIG. 4. Normalized resonator velocities, U and V can be derived from position X and Y with a capacitive input operational amplifier and updated resonator frequency value w derived by the IFP. Antisymmetric velocity feedback with prescribed gain Kp=–$2k\Omega_P$ provides the self-precession force. To regulate amplitude or energy E to prescribed level Eo, automatic gain control is used with proportional and integral control to generate common mode damping gain estimate d distributed via gain matrix (I+$\Delta_d$) to correct damping asymmetry. To regulate quadrature Q to a prescribed level Qo, automatic gain control is used with proportional and integral control to generate position gain estimate k distributed via antisymmetric matrix $\tilde{I}$. Stiffness asymmetry is corrected by symmetric matrix velocity feedback with common gain ks and the two stiffness asymmetry parameters updated from the IFP.

Inertial rate is derived from parameters S and R using analog multiplication, derivatives and summing as shown and with quadrature nulling the denominator becomes a constant value obviating need for analog division. The actual calibrated self-precession rate, $\dot\theta_P$ is updated from the IFP. The angular gain factor, k is dependent only on resonator shape so does not need to be adapted but rather can be applied to the analog output as a scale factor correction by the user.

6. Intermediate Frequency Processor

Figure 5:
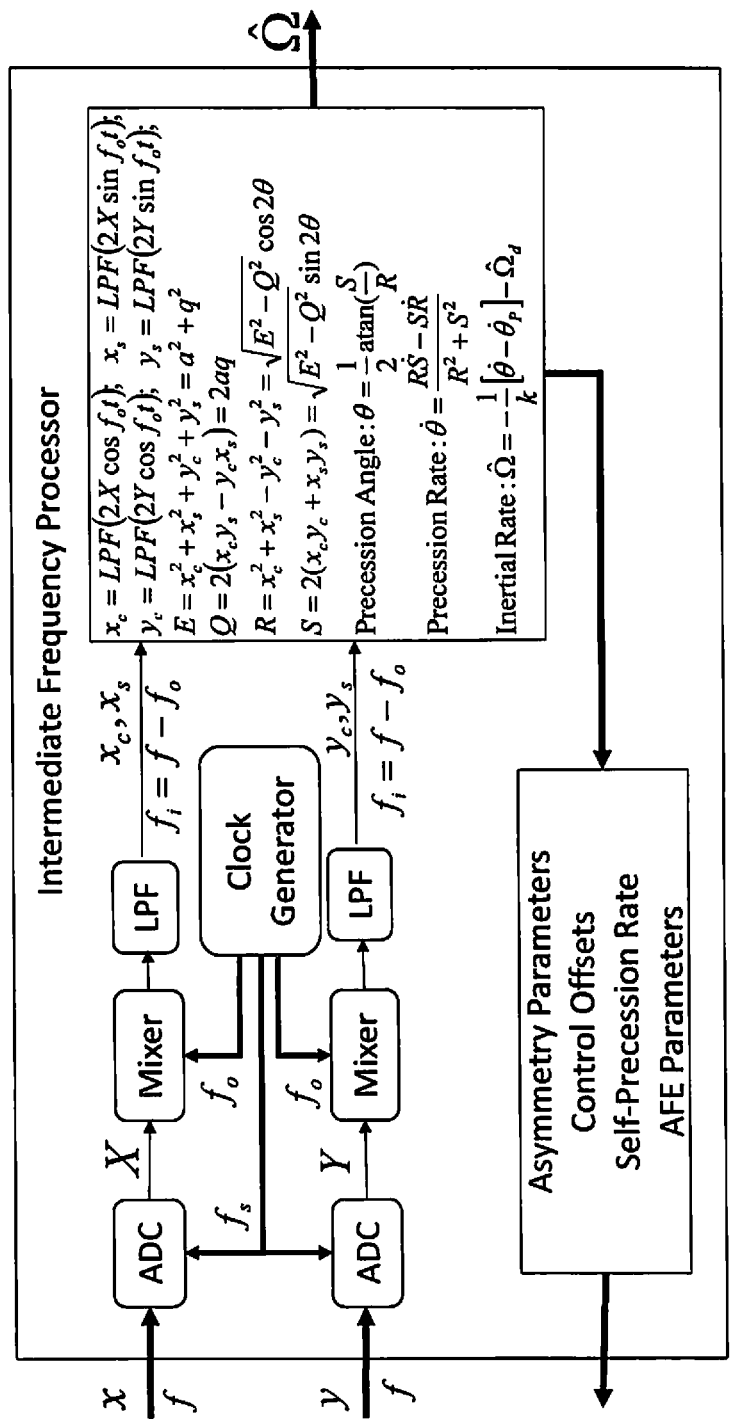
FIG. 5 is a block diagram of example intermediate frequency digital processing electronics to determine the precession rate and remove the self-precession rate to determine inertial rate input.

FIG. 5 is a block diagram of example intermediate frequency digital processing electronics to determine the precession rate and remove the self-precession rate to determine inertial rate input;

Computation of precession angle and parameters of the precession motion at an intermediate frequency, fi to yield precession angle and digital inertial rate output as defined in FIG. 5. An analog-to-digital converter (ADC) samples each sense transducer output, X and Y based on a generated (or external) sample clock frequency, $f_s$. The output of each ADC is mixed down with digital sine and cosine signals at local oscillation frequency $f_o=f-fi<f_s/2$ resulting in intermediate frequency sine and cosine signals xc and xs, and yc and ys, proportional to the original modulation of x and y, respectively. The conventional parameters of the precession motion, E, Q, R and S or a, q and θ previously derived at baseband are computed with simple Nyquist sampled digital signal processing without the need for a high speed digital phase lock loop to track resonator phase. Digital computation of E and Q parameters are used to correct offsets, Eo and Qo in analog amplitude and quadrature control loops.

Fourier analysis of the motion parameters at constant inertial input rate is used to initially define and periodically maintain the damping and stiffness asymmetry parameters for use in asymmetry correction or inertial rate compensation. For instance in light of equation (1) with quadrature nulled to zero and zero or constant rate input the damping asymmetry parameters can be computed from the amplitude and phase of the $2^{nd}$ harmonic of the precession rate variation vs precession angle. These damping parameters can be updated to the ACE for feedback correction or the precession angle dependent rate bias model, Ωd in equation (1) can be used to compensate the final inertial rate output.

With a finite quadrature value, determined from E and Q and with damping asymmetry corrected the precession rate model equation (1) with zero or constant rate can be used to identify the stiffness asymmetry parameters from the amplitude and phase of the $2^{nd}$ harmonic of the precession rate variation vs precession angle. These stiffness asymmetry parameters can be updated in the ACE for feedback correction of asymmetry or used to update the tuning biases in the AFE for electrostatic stiffness correction. Alternatively the zero rate drift model equation (2) can be used to compute an output rate bias compensation $\Omega_d$.

Resonator frequency for update of value w to the ACE or as a thermometer for use in temperature compensation or regulation can be determined from the rate of change of phase angle defined by the position components xs and xc or ys and yc.

7. IWAG Simulation

Figure 6:
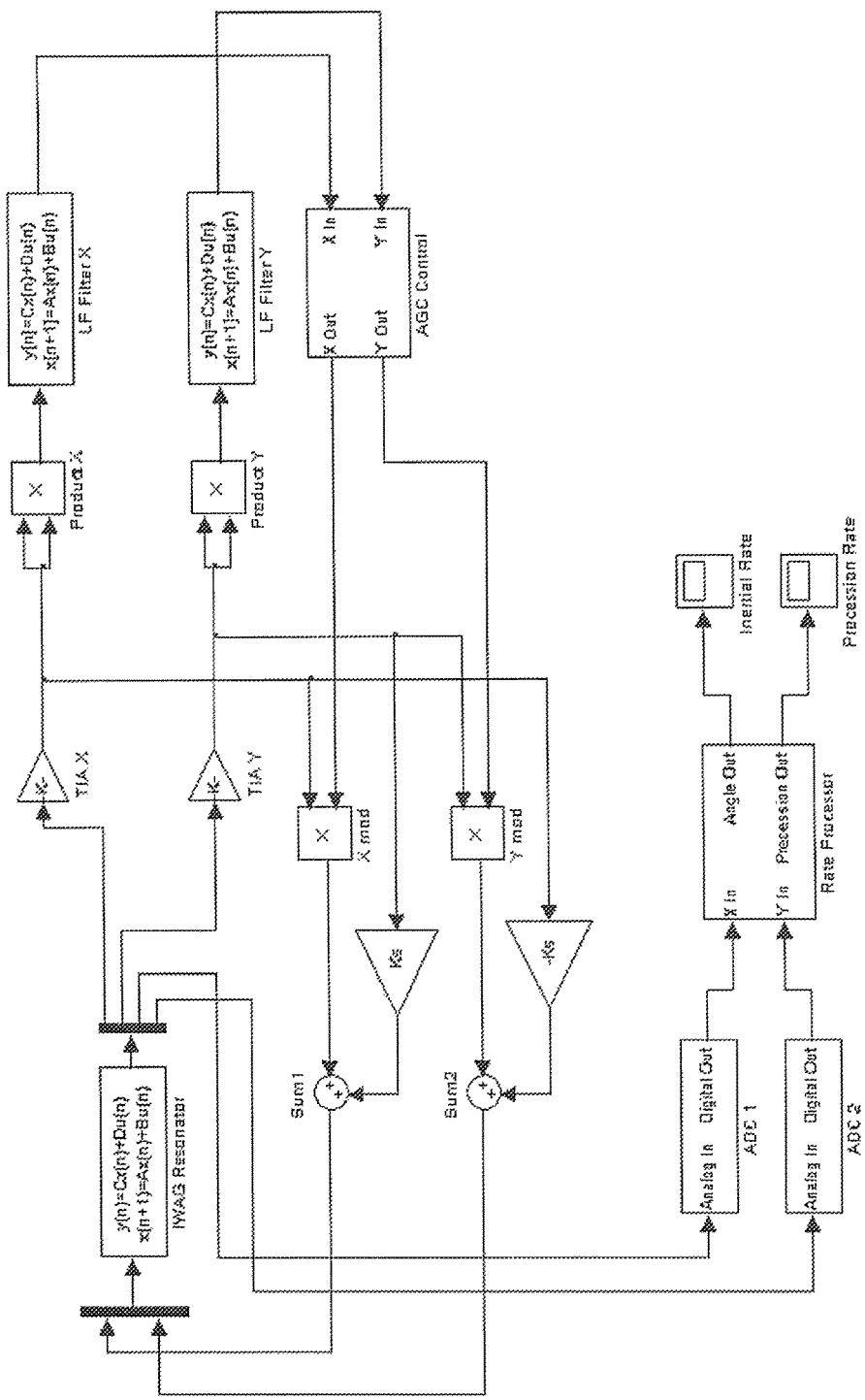
FIG. 6 is an example IWAG analog control simulation in Matlab Simulink.

FIG. 6 is an example IWAG analog control simulation in Matlab Simulink. A simulation of the two degree of freedom oscillator equations with damping and stiffness asymmetry can be used to ACE design regulator gains and IFP asymmetry parameter estimation algorithms. The discrete-time Matlab Simulink simulation model of amplitude and precession control was used to confirm initial feasibility of self-precession but required extremely small time steps or latency to ensure stability.

Figure 7B:
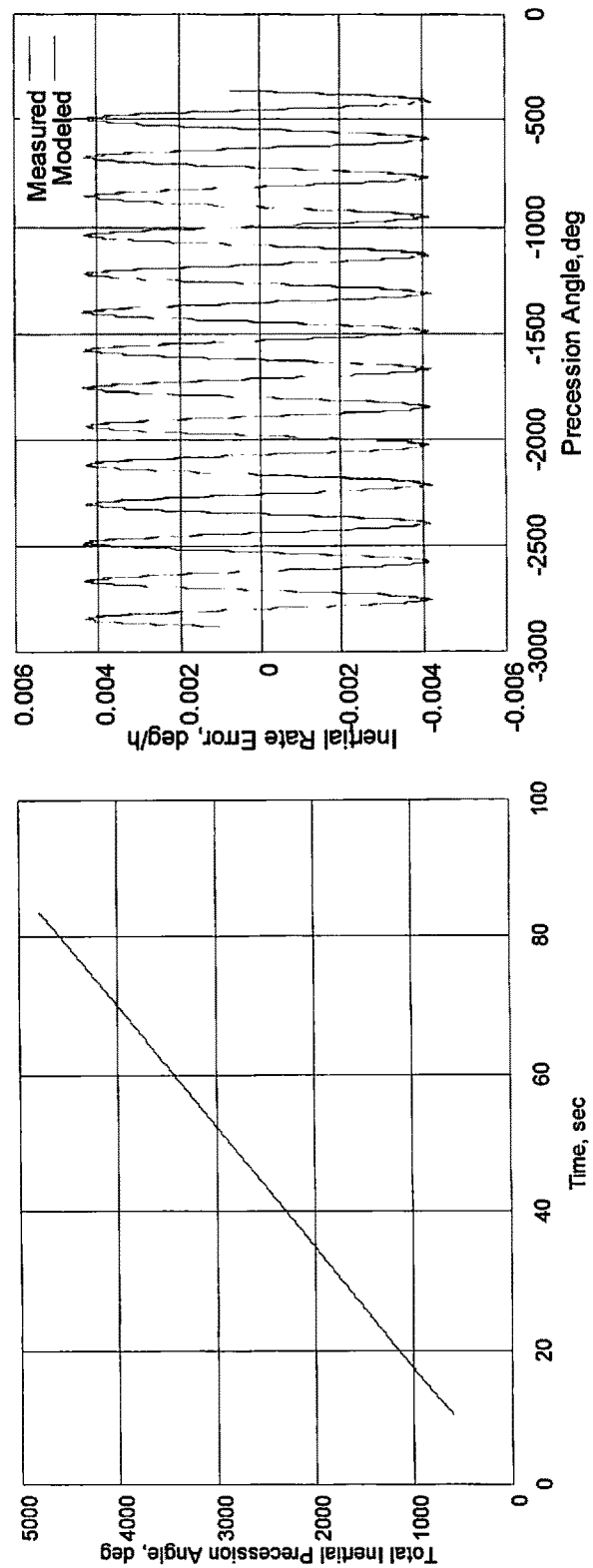
Figure 7C:
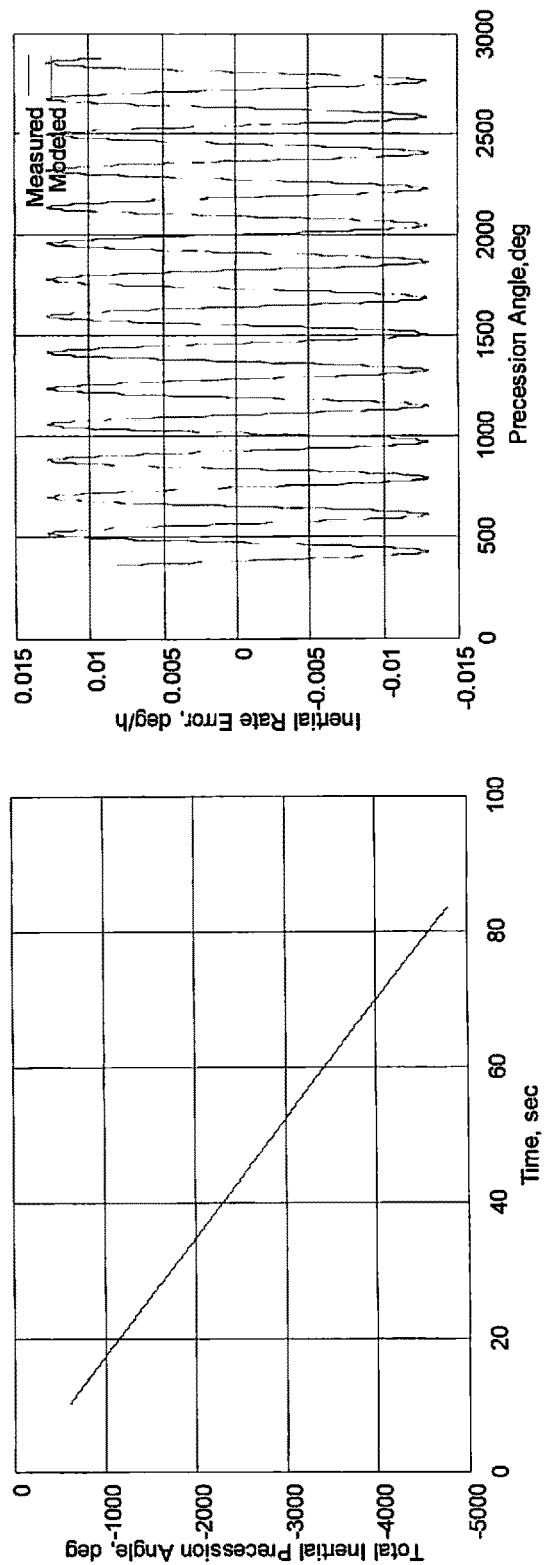

FIGS. 7A, 7B, and 7C show example simulated IWAG parameters and response with damping and stiffness asymmetry and the estimated asymmetry parameters from precession rate variations. To verify the use of analytical equation (1) and (2) used for asymmetry parameter identification an open simulation defined in FIG. 7A with non-zero initial quadrature q0=0.6, zero inertial rate and fixed self-precession rate Wo and with no common mode damping (Qd=inf) was used to generate X and Y waveforms for application of the intermediate frequency processing. This generated a precession rate and inertial rate error shown in FIG. 7B for Wo=1r/s and Wo=-1r/s that was Fourier analyzed to yield the four estimated vs actual asymmetry parameters summarize on FIG. 7A. Each self-precession rate generates a $2^{nd}$ harmonic amplitude and phase or four measurements to solve for the four asymmetry parameters.

8. IWAG Breadboard

Figure 8:
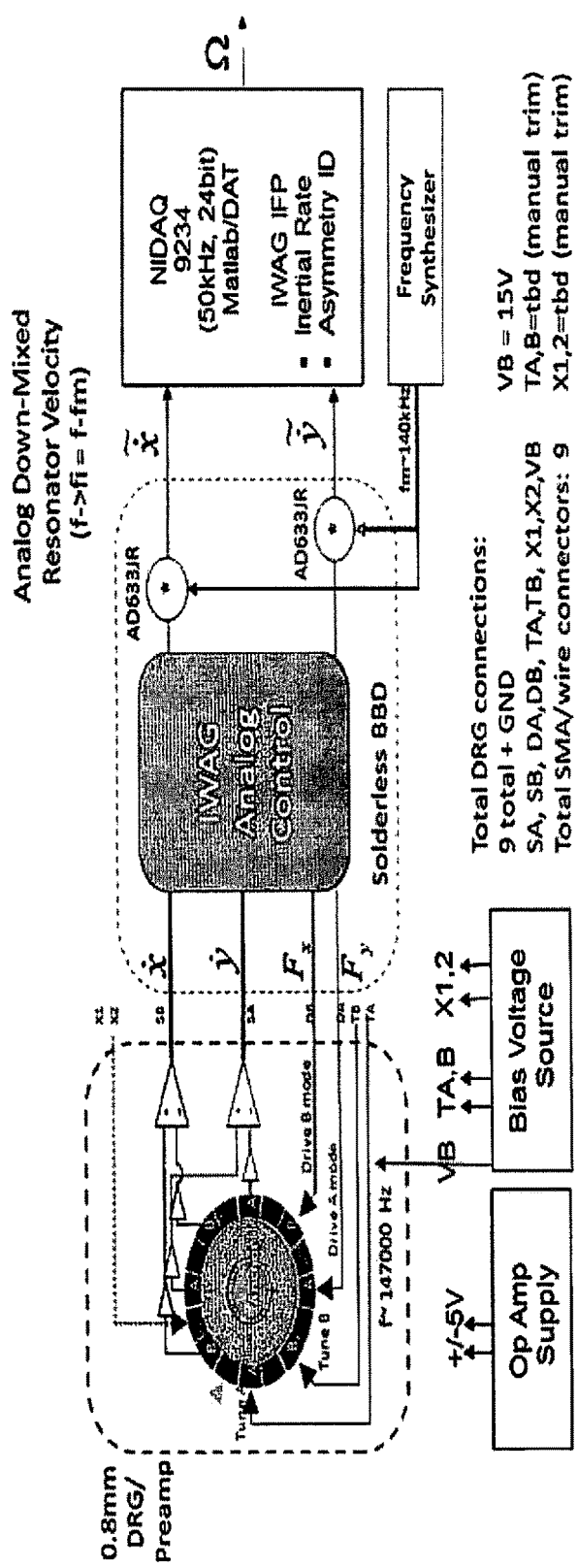
FIG. 8 illustrates an example IWAG breadboard comprising a 0.8 mm DRG MEMS resonator/transducer prototype with Analog Front End PCB electronics, Analog Control Electronics solderless breadboard and Matlab-based IFP.

FIG. 8 illustrates an example IWAG breadboard comprising a 0.8 mm DRG MEMS resonator/transducer prototype with Analog Front End PCB electronics, Analog Control Electronics solderless breadboard and Matlab-based IFP. This is an early IWAG breadboard setup to evaluate common mode amplitude control and self-precession using a specific symmetric MEMS, a 0.8 mm epi-seal DRG with 16 electrodes, frequency f=147000 Hz, Q=120000, k=0.8 and solderless ACE breadboard. In order to evaluate IFP algorithms in floating point Matlab with a high resolution, 24-bit, 50 kHz ADC the X and Y resonator velocity signals produced by the early breadboard AFE were first shifted to an intermediate frequency <50 kHz using analog multipliers. Manual tuning of bias voltages set by potentiometers was used in this case to reduce the initial resonator frequency split <1 Hz.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. For example the sense transducer outputs can be digitized with and ADC and the antisymmetric rate feedback computed digitally and output through a digital-to-analog converter to drive the resonator via the force transducer gain. Additional variations of the present invention may be devised without departing from the inventive concept as set forth in the following claims.

What is claimed is:

1. A gyroscope comprising:
   a resonator having residual asymmetry small enough to yield a defined self-precession rate of a vibration pattern of the resonator; and
   readout electronics coupled to the resonator for generating the defined self-precession rate of the vibration pattern of the resonator;
   wherein the readout electronics measure a total precession rate of the resonator, and subtract the defined self-precession rate from the measured total precession rate to yield an inertial rate output.

2. The gyroscope of claim 1, wherein the defined self-precession rate is defined by a measurement of actual precession rate of the resonator with zero inertial rate input.

3. The gyroscope of claim 1, wherein the defined self-precession rate is defined by a model of the readout electronics and resonator.

4. The gyroscope of claim 1, wherein the readout electronics are implemented in an application specific integrated circuit (ASIC).

5. The gyroscope of claim 1, wherein the readout electronics generate the sufficient precession force employing analog electronic feedback including amplitude and quadrature control.

6. The gyroscope of claim 1, wherein the readout electronics reverse a direction of the defined self-precession rate.

7. The gyroscope of claim 6, wherein reversal of the direction of the defined self-precession rate is performed periodically.

8. The gyroscope of claim 6, wherein reversal of the direction of the defined self-precession rate is performed based on the resonator reaching a threshold precession angle.

9. The gyroscope of claim 1, wherein the readout electronics correct common mode damping and stiffness over temperature and time employing substantially fixed electronic feedback correction of damping asymmetry parameters and stiffness asymmetry parameters.

10. The gyroscope of claim 1, wherein the readout electronics include an intermediate frequency processor for control offset correction, residual asymmetry parameter identification for analog feedback gain correction and electrostatic tuning bias correction and compensated digital inertial rate output.

11. A method of operating a gyroscope comprising:
providing a resonator having residual asymmetry small enough to precess a vibration pattern of the resonator with a defined self-precession rate;
generating the defined precession rate of the vibration pattern of the resonator with readout electronics coupled to the resonator;
measuring a total precession rate of the resonator; and
subtracting the defined self-precession rate from the measured total precession rate to yield an inertial rate output.

12. The method of claim 11, wherein the defined self-precession rate is defined by a measurement of actual precession rate of the resonator with zero inertial rate input.

13. The method of claim 11, wherein the defined self-precession rate is defined by a model of the readout electronics and the resonator.

14. The method of claim 11, wherein the readout electronics are implemented in an application specific integrated circuit (ASIC).

15. The method of claim 11, wherein the readout electronics generate the sufficient precession force employing analog electronic feedback including amplitude and quadrature control.

16. The method of claim 11, wherein the readout electronics reverse a direction of the defined self-precession rate.

17. The method of claim 16, wherein reversal of the direction of the defined self-precession rate is performed periodically.

18. The method of claim 16, wherein reversal of the direction of the defined self-precession rate is performed based on the resonator reaching a threshold precession angle.

19. The method of claim 11, wherein the readout electronics correct common mode damping and stiffness over temperature and time employing substantially fixed electronic feedback correction of damping asymmetry parameters and stiffness asymmetry parameters.

20. The method of claim 11, wherein the readout electronics include an intermediate frequency processor for control offset correction, residual asymmetry parameter identification for analog feedback gain correction and electrostatic tuning bias correction and compensated digital inertial rate output.

* * * * *